2,921,960

SUBSTITUTED AMINO-CARBOXYLIC ACID AMIDES AND METHOD OF MAKING THE SAME

Alfred Kirstahler and Karl Goldann, Dusseldorf, Germany, assignors to Böhme Fettchemie G.m.b.H., Dusseldorf, Germany, a corporation of Germany No Drawing. Application March 13, 1957
Serial No. 645,662

Claims priority, application Germany March 16, 1956

9 Claims. (Cl. 260—534)

This invention relates to substituted amino-carboxylic acid amides and to a method of producing such amides from amines, particularly primary and secondary amines, and amino-carboxylic acids, particularly amino-polycarboxylic acids.

We have found that industrially useful substituted amino-carboxylic acid amides may be obtained by forming amino-salts from polybasic amino-carboxylic acids and transforming the same into the corresponding amino-carboxylic acid amides having the structural formula

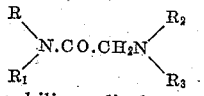

wherein R is a lipophilic radical, $R_1$ is hydrogen or a lipophilic radical, $R_2$ is a monocarboxyalkyl or hydroxyalkyl radical, and $R_3$ is a monocarboxyalkyl radical, by splitting off water.

Amines which may be used as one of the starting materials for the process in accordance with this invention include aliphatic, cycloaliphatic or fatty-aromatic amines which contain at least one high-molecular lipophilic hydrocarbon radical, often referred to as a hydrophobic radical by workers in the art (see Schwartz-Perry, "Surface Active Agents," Interscience Publishers, Inc., New York, 1949), that is, a hydrocarbon radical with at least 6 carbon atoms in the molecule. The lipophilic hydrocarbon radical may also be interrupted by heteroatoms, that is, by O, S or N atoms, or may carry substituents. Amines of this type are, for example, hexylamine, dodecylamine, oleylamine, octadecylamine, cyclohexylamine, alkyl-cyclohexylamines wherein the alkyl radicals have 3 to 12 carbon atoms, naphthenylamine, aniline, alkylanilines wherein the alkyl radicals have 3 to 18 carbon atoms, also amine mixtures, such as coconut amine, as well as secondary amines, such as methyl-oleylamine, ethyl-oleylamine, didodecylamine and so forth.

Amino-carboxylic acids which may be used as the other starting material for the process according to the present invention are nitrilo-acetic acid, ethylene diamine-tetraacetic acid, oxyalkyl-imino-diacetic acids, especially oxyethyl-imino-diacetic acid, oxyethyl-ethylenediamine-triacetic acid, and the like.

The formation of the corresponding amino-salts may be carried out in the usual manner, that is by allowing the starting materials to react at slightly elevated temperatures in aqueous solutions or organic solvents, or also by fusing a mixture of the starting components.

The splitting off of water from the amino-salts may be carried out by heating the salts under dry conditions to temperatures above 100° C., preferably to 180–200° C., and in a vacuum. After working up the product in accordance with customary methods, the substituted amino-carboxylic acid amides according to the invention are obtained with good yields and in the form of light-colored, wax-like products which are soluble or dispersible in water.

Using the reaction of dodecylamine with nitrilo-triacetic acid as an illustrative example, the reaction takes place according to the following equation:

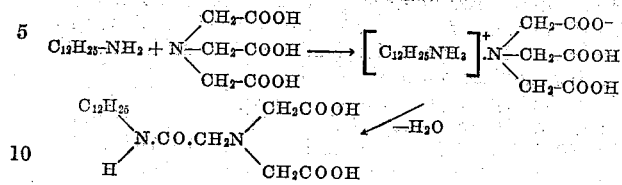

The products obtained in accordance with the present invention are useful in the textile and leather industries, for example as softening agents, plasticizing agents, antistatic agents, as washing agents in chrome-tanning, and as corrosion-preventing agents.

The following examples will further illustrate the present invention without limiting it to the particular examples.

Example I 27.7 gm. n-dodecylamine were dissolved in 300 cc. methanol and then 28.1 gm. hydroxyethyl-imino-diacetic acid were added to the solution at 50–60° C., accompanied by stirring. After stirring for an additional hour at 65° C. and allowing the reaction mixture to cool to 10° C., the precipitate formed thereby was filtered off by suction filtration and dried. The yield was 47 gm. of the monododecylamine salt of hydroxyethyl-imino-diacetic acid. By evaporation of the mother liquor, the yield of reaction product was increased to 50.5 gm. The salt thus obtained was heated at 180–190° C. in a vacuum of about 12 mm. Hg, and when necessary in a stream of nitrogen gas, until no more water was split off, which was evidenced by the cessation of the formation of bubbles. The residue was dissolved in methanol and transformed into the corresponding sodium salt by adding thereto a methanolic sodium hydroxide solution consisting of 5.8 gm. sodium hydroxide dissolved in 100 cc. methanol. Thereafter, the methanol was evaporated in vacuo, and the residue was dried in vacuo at a temperature of 70° C. The yield was 52.5 gm. of a compound having the structural formula

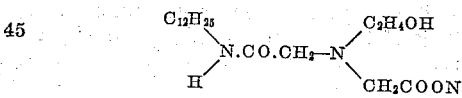

which corresponds to 93% of the theoretical yield based on the amount of n-dodecylamine originally used.

Example II 36.2 gm. coconut amine (molecular weight 191) were dissolved in 400 cc. methanol and thereafter transformed into the corresponding salt with 37.4 gm. hydroxyethyl-imino-diacetic acid, as described in Example I. The salt was recrystallized from methanol. The yield was 80 gm. The dehydration also took place at 180–190° C./12 mm. Hg as in the preceding example. The residue was transformed into the corresponding sodium salt, as in the preceding example, with a methanolic sodium hydroxide solution composed of 6.7 gm. sodium hydroxide dissolved in 100 cc. methanol. The yield was 62.5 gm. of a product having the probable structural formula

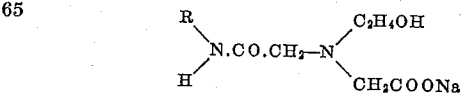

wherein R represents the fatty hydrocarbon radicals in the coconut amine, corresponding to 86% of the theoretical yield based on the amount of coconut amine originally used.

Example III 37 gm. dodecylamine were dissolved in 500 cc. ethanol. Thereafter, the solution was heated to 60–65° C. and 38 gm. nitrilo-triacetic acid were added thereto while stirring. The reaction mixture was stirred and heated for an additional two hours and filtered while hot, whereby a small amount of unreacted nitrilo-triacetic acid was recovered. The monododecylamino salt of nitrilo-triacetic acid crystallized out of the filtrate. The yield of salt was increased by evaporating the mother liquor. The total yield was 41 gm. The salt thus obtained was dehydrated at 180–200° C./12 mm. Hg as in Example I. The residue was dissolved in methanol (with the exception of small amounts of greasy components) and transformed into the corresponding disodium salt with a calculated amount of a methanolic sodium hydroxide solution. The free disodium salt was isolated by distilling off the methanol in vacuo and drying the residue at 70° C./12 mm. Hg. The yield was 30 gm. of a compound having the structural formula

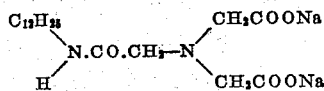

which corresponds to 37% of the theoretical yield based on the amount of dodecylamine originally used.

Example IV 76.4 gm. coconut amine (mol wt. 191) were reacted with 75.2 gm. nitrilo-triacetic acid according to the procedure described in Example III. Upon working up the reaction product in the manner described in the preceding example, 83 gm. of a compound having the probable formula

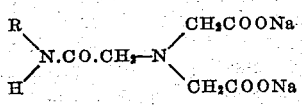

wherein R represents the fatty hydrocarbon radicals in the coconut amine, were obtained. The yield was 50.5% of theory.

While we have illustrated our invention with the aid of certain specific embodiments thereof, it will be apparent to persons skilled in the art that the present invention is not limited to those embodiments and that various changes and modifications may be made without departing from the spirit of the invention or the scope of the appended claims.

We claim:

1. Compounds having the structural formula

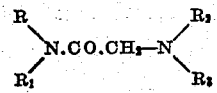

wherein R is an aliphatic hydrocarbon radical containing from 6 to 18 carbon atoms, $R_1$ is a hydrogen radical, $R_2$ is selected from the group consisting of lower hydroxy-alkyl and monocarboxy-methyl, and $R_3$ is monocarboxy-methyl.

2. A compound selected from the group consisting of the acid having the structural formula

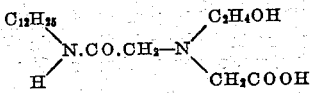

and its monosodium salt.

3. A compound selected from the group consisting of the acid having the structural formula

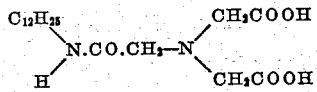

and its disodium salt.

4. The process of producing compounds having the structural formula

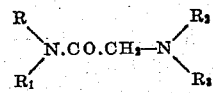

wherein R is an aliphatic hydrocarbon radical containing from 6 to 18 carbon atoms, $R_1$ is a hydrogen radical, $R_2$ is selected from the group consisting of lower hydroxyalkyl and monocarboxy-methyl, and $R_3$ is monocarboxy-methyl, which comprises reacting a primary amine containing an aliphatic hydrocarbon radical containing from 6 to 18 carbon atoms with a compound selected from the group consisting of dibasic and polybasic aliphatic amino-carboxylic acids to form the corresponding amino-salts of said amino-carboxylic acids, and dehydrating said amino-salts at temperatures between 100 and 200° C. at reduced pressures.

5. The process of claim 4 wherein the amine reactant is dodecylamine.

6. The process of claim 4 wherein the amino-carboxylic acid is hydroxyethyl-imino-diacetic acid.

7. The process of claim 4 wherein the amino-carboxylic acid is nitrilo-triacetic acid.

8. The process of claim 4 wherein the amino is coconut amine.

9. The process of claim 4 wherein the dehydration is accomplished at temperatures of from about 180 to 200° C.

References Cited in the file of this patent

UNITED STATES PATENTS

| | | |
|---|---|---|
| 2,508,924 | Mertens et al. | May 23, 1950 |
| 2,796,407 | Fields | June 18, 1957 |